Jan. 27, 1942.　　　R. J. HULL ET AL　　　2,271,432
TIRE AND WHEEL STRUCTURE
Filed Sept. 30, 1939
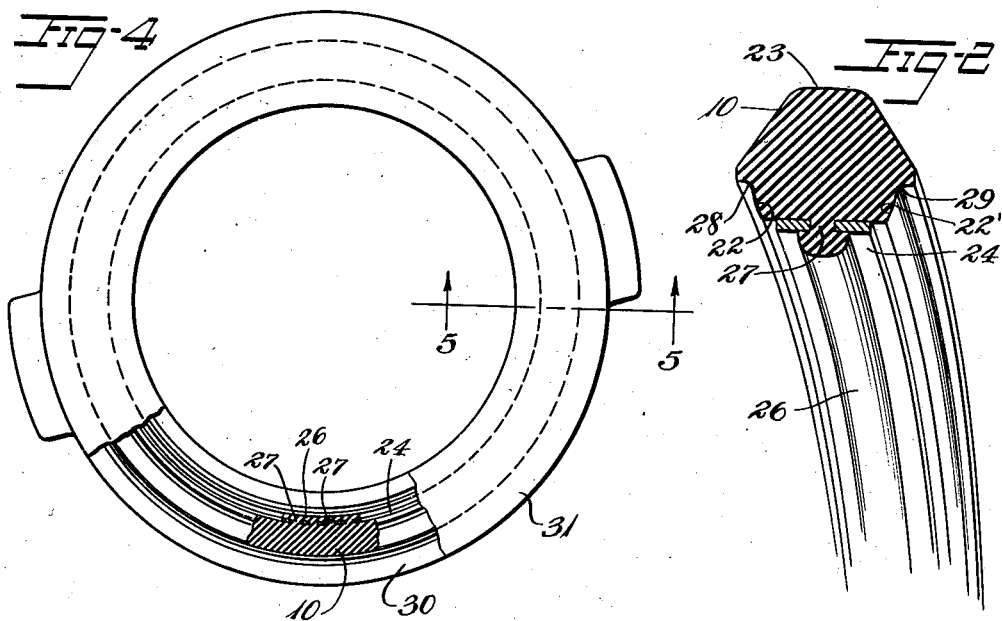
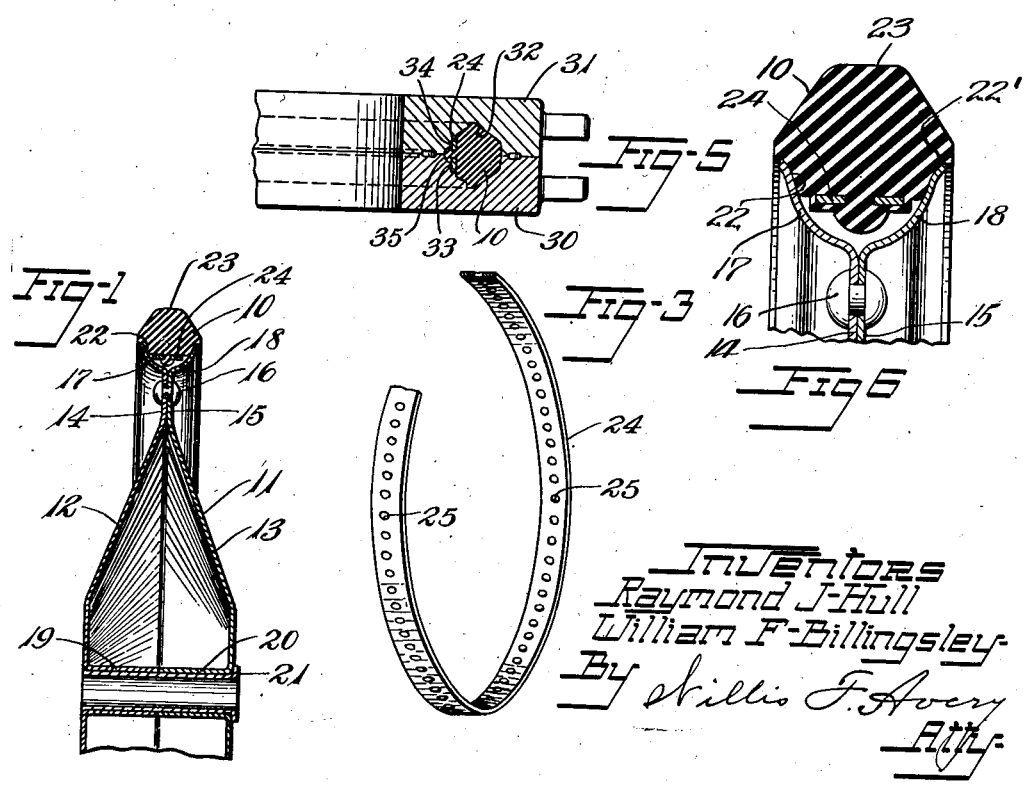

Patented Jan. 27, 1942

2,271,432

UNITED STATES PATENT OFFICE 2,271,432

TIRE AND WHEEL STRUCTURE

Raymond J. Hull, Akron, and William F. Billingsley, Silver Lake, Ohio, assignors to The B. F. Goodrich Company, New York, N. Y., a corporation of New York Application September 30, 1939, Serial No. 297,286

1 Claim. (Cl. 152—388)

This invention relates to tire and wheel structures, and more particularly to rigid wheels having removable resilient tires, and to resilient tires therefor. The invention is especially useful in the construction of wheels for toy vehicles and vehicles for juveniles where simplicity of construction and low cost together with reliable operation are imported.

It has been customary to provide resilient tires for such vehicles in which the tire is molded or extruded as a straight article and is then bent and secured about the perimeter of a wheel by wires or other securing means extending through a circumferential aperture formed in the tire. Such tires often have an offset, gap, or projection where the ends of the tire meet, causing unbalance and irregular resistance to rolling of the wheel and are therefore not suitable where great speed and minimum friction are necessary as in coasting vehicles. Such tires also require special tools and equipment for mounting them on the wheels and have short life due to the fact that their tread portions are in a stretched condition and they are more subject to rapid and uneven wear.

The principal objects of the present invention are to provide for producing accurately dimensioned, balanced tire and wheel structures; to provide simplicity of construction; to provide security; to provide efficiency of operation; and to provide a structure which may be easily assembled without the use of special tools.

Other objects are to provide simplicity of manufacture of the tire; to provide for mounting the tire without circumferential tensioning of the tread portion, and to provide adequate seating of the tire against the wheel.

These and other objects will appear from the following description and the accompanying drawing.

Of the drawing:

Fig. 1 is a cross-sectional view of a tire and wheel structure constructed according to and embodying the invention, the lower part of the wheel being broken away.

Fig. 2 is a perspective view of a section of the tire drawn to a larger scale.

Fig. 3 is a perspective view of the base ring, part of the ring being broken away to show it in section.

Fig. 4 is a plan view of a mold for forming the tire, with the tire and base ring therein, part of the upper half of the mold being broken away and shown in section.

Fig. 5 is a cross section of the mold with the completed tire therein, taken on line 5—5 of Fig. 4.

Fig. 6 is a cross-sectional view of a modified form of the invention.

Referring to the drawing:

The numeral 10 designates a resilient tire of rubber-like material and the numeral 11 designates a rigid wheel on which the tire is mounted, the wheel comprising a pair of disk members 12, 13 of frusto conical shape having radial flanges 14, 15 at their bases secured together by a plurality of rivets 16 or bolts or other fastening means extending through the flanges at spaced intervals about the wheel. The flanges 14, 15 are flared outwardly away from their contacting portions about their perimeters as at 17, 18 to provide a substantially semi-cylindrical peripheral trough or rim for seating the resilient tire 10. The centers of the disks 12, 13 are flanged inwardly toward each other as at 19, 20 to provide a central aperture through the wheel about the axis thereof to receive a removable hub 21.

The tire 10 comprises a resilient annular body of resilient rubber-like material, such as a vulcanized composition of rubber or other rubber-like material, having a seating portion 22, 22' shaped to correspond to the channel or rim of the wheel and seated therein and a tread portion 23 extending therefrom in contact with the roadway. For providing against circumferential stretch of the tread portion and for retaining the tire in proper position upon the wheel an annular endless base ring 24 of rigid material such as steel, brass or other material is integrally united to the tire at its inner periphery and is preferably at least partially embedded in the resilient body of the tire and is preferably secured to the rubber by a vulcanized bond. The band is preferably formed with a series of spaced apertures 25 for locking it to the resilient body of the tire, and for assisting in molding of the tire, the tire being preferably formed with an annular bead 26 of rubber-like material extending along the inner periphery of the band and united to the resilient material comprising the body of the tire by integral studs 27 extending through the apertures. The arrangement preferably is such that the margins of the metal band are exposed on the surface of the tire to assist in locating and centering the band during the manufacture of the tire, although if desired, the metal band may be wholly embedded in the body of the tire, as shown in Fig. 6.

The tire is formed laterally of the retaining band with shoulders 28, 29 on opposite sides thereof adapted to seat against the margins of the respective rim flanges, and the tire body and the rim portion of the wheel are preferably so dimensioned that seating of these shoulders upon the margins of the rim flanges slightly tensions the resilient material directly over the shoulders to seal the joint between the wheel and the tire and to provide frictional resistance to slipping. The retaining band and the rib 26 of rubber are dimensioned to clear the rim in this position and the retaining band acts to apply tension to the sealing shoulders. As the forces acting to retain the tire are radially inwardly directed forces acting at the retaining band due to the non-stretchable retaining band, and resisting forces acting radially inwardly against the shoulders 28, 29, the tread portion 23 of the tire is under a resulting compression due to its arched cross-sectional shape and therefore well adapted to resist wear.

Such tires while providing adequate resistance to slippage about the rim of the wheel and uniformity and continuity of the tread surface may be manufactured without difficulty and at low cost by use of a mold comprising annular mold plates 30, 31 having an annular cavity 32 therebetween. Such cavity is provided with shoulders 33, 34 for accurately centering and positioning the retaining band 24. While the retaining band is in place in the mold its radial apertures 25 provide communication between the portion 35 of the annular cavity for forming the rib 26 and the main chamber of the cavity for forming the tread portion of the tire. In the manufacture of tires by the employment of this mold the retaining bands 24 may be set in the lower half of the mold cavity outside the shoulders 33, 34. When the mold is closed under pressure applied to the mold plates the rubber material will flow to fill the tread cavity and will also flow through the apertures 25 and fill the rib cavity thereby permanently securing the retaining band to the body of rubber which is then vulcanized in place by the application of heat and continued pressure. The completed tire is then removed from the mold and is ready for use. The tire may then be assembled between disk members 12, 13 of the wheel and the disk members may be drawn together by rivets or other fastening means 16. The shoulders 28, 29 are sufficiently stretched in the assembling operation to prevent slipping of the tire about the wheel. While rivets are used to fasten the wheel disks together these may be removed for replacing the tire by chipping the heads from the rivets or by drilling them away. For quick removability bolts may be substituted for rivets.

Variations may be made without departing from the invention as it is defined by the following claim.

We claim:

A wheel and tire assembly comprising a channel rim and an endless annular tire seated thereon, said rim comprising axially spaced rim members having walls diverging radially outward and terminating in annular outwardly facing shoulders, means for clamping said members together with their diverging walls spaced apart to define an outwardly facing channel therebetween, said tire comprising a body of resilient material having a wide tread portion extending radially beyond the rim members and a narrower retaining portion extending into said channel, and a non-stretchable retaining band of less outer circumference than the shoulders of the rim members and narrower than the channel therebetween and at least partially embedded in and intimately secured to the material of said retaining portion, said tire having inwardly facing shoulders at its sides between said tread and retaining portions of less circumference than the shoulders of said rim members and stretched thereover, and the retaining portion of said tire radially inward of said retaining band being of greater circumference than the portions of the rim members radially adjacent thereto and being out of contact with the rim members.

RAYMOND J. HULL.
WILLIAM F. BILLINGSLEY.